Patented June 28, 1927.

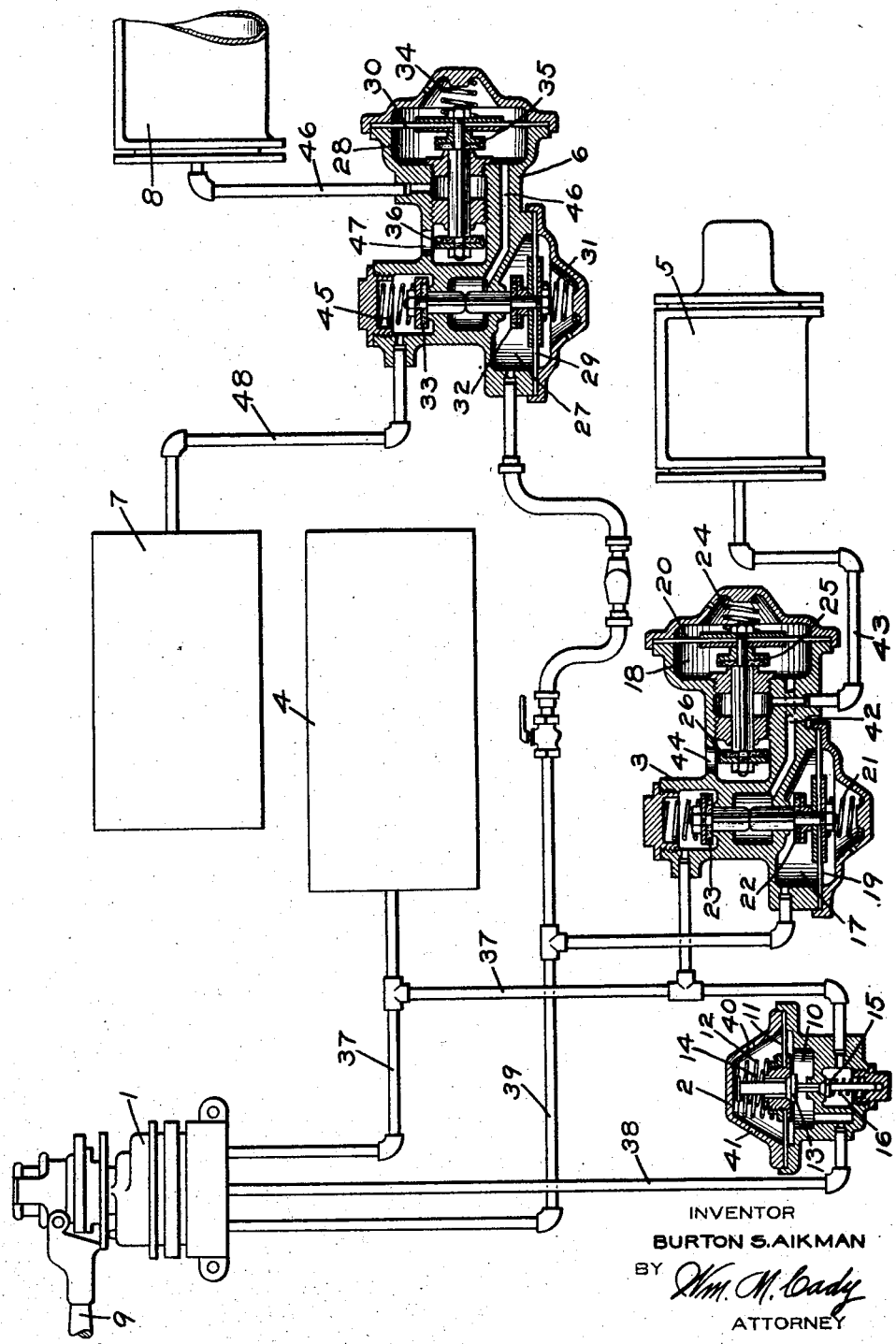

1,633,756

UNITED STATES PATENT OFFICE.

BURTON S. AIKMAN, OF MILWAUKEE, WISCONSIN, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE SYSTEM.

Application filed July 7, 1925. Serial No. 42,016.

This invention relates to fluid pressure brakes and more particularly to a straight air emergency brake equipment.

The principal object of my invention is to provide an improved straight air emergency brake in which a single train pipe is employed for both straight air and emergency operation.

In the accompanying drawing, the single figure is a diagrammatic view, partly in section, showing a motor car and trailer brake equipment embodying my invention.

As shown in the drawing, the motor car equipment may comprise a brake valve device 1, a brake pipe pressure maintaining valve device 2, an application valve device 3, a main reservoir 4 and a brake cylinder 5. The trailer car equipment may comprise an application valve device 6 of the same type as on the motor car, an emergency reservoir 7 and a brake cylinder 8.

The brake valve device 1 may be of the usual construction, having an operating handle 9. The maintaining valve device 2 may comprise a casing containing a flexible diaphragm 11, which is subject on one side to the pressure of a coil spring 12 and on the other side to the pressure of fluid in chamber 10. Disposed at the center of diaphragm 11 is a valve 13, normally held seated by a spring 14, and adapted upon a predetermined movement of said diaphragm in one direction to be unseated so as to vent pressure from chamber 10, and upon a predetermined movement of said diaphragm 11 in the other direction to engage and unseat a valve 15 normally held seated by a spring 16.

The application valve device 3 may comprise a casing containing flexible diaphragms 19 and 20. The diaphragm 19 is subject on one side to the pressure of a coil spring 21 and on the other side to the pressure of fluid in chamber 17, said diaphragm being adapted to operate double beat valves 22 and 23. The diaphragm 20 is subject on one side to the pressure of a coil spring 24 and on the other side to the pressure of fluid in chamber 18, said diaphragm being adapted to operate double beat valves 25 and 26.

The valve device 6 of the trailer equipment may comprise a casing containng flexible diaphragms 29 and 30. The diaphragm 29 is subject on one side to the pressure of a coil spring 31 and on the opposite side to the pressure of fluid in chamber 27, said diaphragm being adapted to operate double beat valves 32 and 33, the stems of which have butt contact with each other. A light spring 45 acts on one side of valve 33 to normally hold said valve seated. The diaphragm 30 is subject on one side to the pressure of a coil spring 34 and on the opposite side to the pressure of fluid in the chamber 28, said diaphragm being adapted to operate double beat valves 35 and 36.

The pressure exerted by the spring 12, on the diaphragm 11 of the maintaining valve device 2, is such that when the pressure of fluid acting on the opposite side of said diaphragm is less than a predetermined amount, such for example as 15 pounds, said spring will move the diaphragm 11 so as to unseat the valve 15 and permit fluid under pressure from the main reservoir 4 to flow through pipe 37 past unseated valve 15 to pipe 38, which in running position of the brake valve device 1 is connected to the control pipe 39.

It will thus be seen that the pressure of fluid in the pipe 38 and in the control pipe 39 when connected thereto is maintained at a predetermined degree such as 15 pounds. If the pressure in pipe 38 and consequently in diaphragm chamber 10 should for any reason exceed said predetermined amount, the pressure in chamber 10 will be sufficient to overcome the pressure exerted by the spring 12 and move the diaphragm 11, so as to unseat valve 13, thereby venting fluid from chamber 10 to atmosphere by way of atmospheric exhaust ports 40 and 41.

The control pipe 39 is connected to the diaphragm chambers 17 and 27 of the valve devices 3 and 6, so that fluid under pressure is maintained in said diaphragm chambers at the pressure carried in the control pipe. When the control pipe 39 is charged to the predetermined normal pressure, the spring 21 is such that the pressure of same will be overcome and the diaphragm 19 will be moved, so as to seat the double beat valve 23 and unseat valve 22. The unseating of valve 22 permits fluid under pressure from chamber 17 to flow through passage 42 to diaphragm chamber 18, where it acts on diaphragm 20.

The spring 24, acting on the diaphragm 20 is of such force that when the predetermined normal fluid pressure is present in chamber 18, the spring pressure will slightly exceed the fluid pressure acting on the diaphragm in chamber 18, so that the diaphragm 20 will be maintained by the spring 24 in position to hold the valve 25 closed and the valve 26 in its open position. With the valve 26 unseated, the brake cylinder 5 is connected to atmosphere by way of pipe 43 past unseated valve 26 and atmospheric exhaust port 44.

The application valve device 6 on the trailer car is similar to the application valve device 3 on the motor car, so that when the control pipe is charged at the normal predetermined pressure, the diaphragm 29 is operated to unseat the valve 32, permitting the valve 33 to seat. Fluid under pressure therefore flows through passage 46 to diaphragm chamber 28, but the predetermined pressure not being sufficient to overcome the force of the spring 34, the diaphragm 30 will be held in position to close the valve 35 and hold the valve 36 unseated, so that the brake cylinder 8 is connected to the atmosphere by way of pipe 46 and atmospheric exhaust port 47.

On the trailer car, when the valve 32 is held unseated by the normal predetermined control pipe pressure acting on diaphragm 29, fluid under pressure will lift the valve 33 and will charge the emergency reservoir 7 to a degree somewhat less than the predetermined pressure carried in the control pipe, dependent upon the pressure of spring 45.

When it is desired to effect a straight air service application of the brakes, the operating handle 9 of the brake valve device 1 is moved to service position, in which the main reservoir pipe 37 is connected to control pipe 39, so that fluid under pressure from the main reservoir 4 flows through pipes 37 and 39 to diaphragm chambers 17 and 27 respectively of the valve devices 3 and 6. From diaphragm chamber 17 fluid flows past unseated valve 22 and through passage 42 to diaphragm chamber 18. The pressure of fluid thus supplied to the control pipe 39, being in excess of the normal predetermined pressure carried in the control pipe, overcomes the pressure of spring 24 and acts to move diaphragm 20 so as to seat the valve 26, thus cutting off the exhaust from the brake cylinder 5, and unseat the valve 25, permitting flow of fluid from the control pipe 39 past unseated valve 25 and through pipe 43 to brake cylinder 5.

In a like manner fluid from diaphragm chamber 27 flows past unseated valve 32 through passage 46 to diaphragm chamber 28, where it acts to move diaphragm 30 so as to seat the exhaust valve 36 and unseat the supply valve 35, permitting fluid under pressure to flow from the control pipe 39 past the unseated valve 35 and through pipe 46 to the brake cylinder 8.

The pressure of fluid supplied to diaphragm chamber 27, during a straight air service application of the brakes, in excess of the normal control pipe pressure also acts to unseat check valve 33 against the pressure exerted by spring 45 and permit fluid under pressure to flow past said unseated valve, through pipe 48 to the emergency reservoir 7, increasing the pressure therein from a degree slightly less than the normal predetermined pressure carried in the control pipe with which the emergency reservoir was charged when the control pipe was charged to the normal predetermined pressure to substantially the pressure of the straight air application. It being general practice to make a full service brake application, as soon as a motor car and trailer are coupled together, in order to test the brakes on the trailer car, the emergency reservoir on a trailer car will be charged before the cars start on a run.

When it is desired to effect a release of the brakes, the handle 9 of brake valve device 1 is moved to release position, in which the control pipe 39 is connected to atmosphere, so that fluid from the brake cylinder 5 flows through pipe 43 past unseated valve 25 through passage 42 past unseated valve 22 through diaphragm chamber 17 to control pipe 39 and thence to atmosphere by way of the brake valve. Likewise fluid from the brake cylinder 8 flows through pipe 46 past unseated valve 35, through passage 46, past unseated valve 32 to control pipe 39 and thence to atmosphere through the brake valve device.

When the pressure of fluid in control pipe 39 and consequently in brake cylinders 5 and 8 has been reduced to the predetermined degree normally carried in said control pipe, the spring 24 acting on the opposite side of diaphragm 20 moves said diaphragm so as to seat valve 25 and unseat valve 26, permitting the remainder of fluid under pressure in the brake cylinder 5 to flow to atmosphere by way of pipe 43 past unseated valve 26 and through atmospheric exhaust port 44. In the same manner the spring 34 of the valve device 6 on the trailer car moves the diaphragm 30 so as to seat valve 35 and unseat valve 36, permitting fluid from the brake cylinder 8 to flow to atmosphere through pipe 46 past unseated valve 36 to atmospheric exhaust port 47. It will be evident that fluid may be released from the brake cylinder in graduated amounts by alternately moving the brake valve operating handle 9 between release and lap positions.

An emergency application of the brakes may be effected by moving the operating handle 9 of the brake valve device 1 to emergency position, or by the bursting of a hose connecting the control pipe between the motor car and trailer car, or by any means which reduces the pressure of fluid in the control pipe 39 below the predetermined degree of pressure normally carried in said control pipe.

The reduction of pressure in control pipe 39 correspondingly reduces the pressure of fluid in the diaphragm chambers 17 and 27 of the valve devices 3 and 6. The reduction of pressure in diaphragm chamber 17 permits the pressure exerted by spring 21 on the opposite side of diaphragm 19 to move said diaphragm so as to seat valve 22 and unseat valve 23, permitting fluid under pressure from the main reservoir 4 to flow through pipe 37 past unseated valve 23 and through passage 42 to diaphragm chamber 18, applying the brakes in the same manner as hereinbefore described under service operation.

The reduction of pressure in the diaphragm chamber 27 permits the pressure exerted by spring 31 on the opposite side of diaphragm 29 to move said diaphragm so as to seat valve 32 and unseat valve 33, permitting fluid under pressure from the emergency reservoir 7 to flow through pipe 48 past said unseated valve and through passage 46 to diaphragm chamber 28, which operates to apply the brakes in the same manner as hereinbefore described.

It will be noted that according to my invention a saving of fluid is effected, since only that amount of fluid, which is in excess of the normal predetermined degree usually carried in the control pipe, is released through the control pipe and the brake valve device, the remainder being released locally at each application valve device, so that the control pipe is kept constantly charged at the predetermined degree and does not have to be entirely vented and again built up after each application.

Having now described my invention, what I claim as new and desire to secure by Letters Patent, is:—

1. In a fluid pressure brake, the combination with a brake cylinder and a control pipe normally containing fluid at a predetermined pressure, of a movable abutment and valve means operated by said abutment upon an increase in pressure in the control pipe above normal for supplying fluid to the brake cylinder, and a second movable abutment and valve means operated by said abutment upon a reduction in pressure in the control pipe below normal for supplying fluid to the brake cylinder.

2. In a fluid pressure brake, the combination with a brake cylinder and a control pipe normally containing fluid at a predetermined pressure, of a movable abutment and valve means operated by said abutment upon an increase in pressure in the control pipe above normal for supplying fluid to the brake cylinder, and a second movable abutment and valve means operated by said abutment upon a reduction in pressure in the control pipe below normal for supplying fluid under pressure to the first mentioned valve means.

3. In a fluid pressure brake, the combination with a brake cylinder and a control pipe normally containing fluid at a predetermined pressure, of a valve device operated upon an increase in pressure in the control pipe above normal for supplying fluid to the brake cylinder and valve means for normally establishing communication from the control pipe to said valve device and operated upon a reduction in pressure in the control pipe for cutting off said communication and for supplying fluid under pressure to said valve device.

4. In a fluid pressure brake, the combination with a brake cylinder and a control pipe normally containing fluid at a predetermined pressure, of a valve device comprising a valve for controlling the supply of fluid to the brake cylinder, and a movable abutment subject on one side to a constant pressure and operated upon an increase in fluid pressure on the opposite side for opening said valve, and valve means normally establishing communication from the control pipe to said valve device and operated upon a reduction in pressure in the control pipe for cutting off said communication and for supplying fluid under pressure to said valve device.

5. In a fluid pressure brake, the combination with a brake cylinder and a control pipe normally containing fluid at a predetermined pressure, of a reservoir, a check valve controlling communication from the control pipe to said reservoir and operated when the control pipe pressure is in excess of the pressure in the reservoir for permitting flow of fluid from the control pipe to the reservoir, and a movable abutment subject to control pipe pressure and operated upon a reduction in control pipe pressure for operating said valve to establish communication from said reservoir to the brake cylinder.

6. In a fluid pressure brake, the combination with a brake cylinder and a control pipe normally containing fluid at a predetermined pressure, of a reservoir, valve means operated upon an increase in pressure above the normal pressure carried in the control pipe for opening a communication through which fluid is supplied to the brake cylinder, a valve for controlling communication from said reservoir to said valve means, a valve for controlling communication from the control pipe to the first mentioned valve, and a movable abutment operated upon a reduction in control pipe pressure for operating said valves to cut off communication from the control pipe and open communication from the reservoir to said valve means.

7. In a fluid pressure brake, the combination with a brake cylinder and a control pipe normally containing fluid at a predetermined pressure, of a reservoir, valve means operated upon an increase in pressure above the normal pressure carried in the control pipe for opening a communication through which fluid is supplied to the brake cylinder, valves for controlling the supply of fluid from the control pipe to said reservoir, from the control pipe to said valve means, and from the reservoir to said valve means, and a movable abutment operated upon a reduction in pressure in the control pipe for cutting off communication through which fluid is supplied from the control pipe and for opening communication through which fluid is supplied from said reservoir to said valve means.

8. In a fluid pressure brake, the combination with a brake cylinder and a control pipe normally containing fluid at a predetermined pressure, of a reservoir, valve means operated upon an increase in pressure above the normal pressure carried in the control pipe for opening a communication through which fluid is supplied to the brake cylinder, a check valve operated by the pressure in the control pipe for opening communication from the control pipe to said reservoir, a valve for controlling communication from the control pipe to said check valve and to said valve means, and a movable abutment operated at the normal pressure carried in the control pipe for operating said valve to open communication from the control pipe to said check valve and said valve means and operated upon a reduction in pressure in the control pipe below normal for closing said valve and for opening said check valve to establish communication from said reservoir to said valve means.

9. In a fluid pressure brake, the combination with a brake cylinder, a source of fluid under pressure, and a control pipe normally containing fluid at a predetermined pressure, of valve means operated at or below said normal pressure for connecting said brake cylinder with the exhaust and operated upon an increase in fluid pressure above the normal pressure for closing said exhaust and for supplying fluid to the brake cylinder and a valve device operated at or above the normal pressure for establishing communication from the control pipe to said valve means and operated upon a reduction in pressure below said normal pressure for cutting off communication from the control pipe to said valve means and for opening communication from said source of fluid pressure to said valve means.

In testimony whereof I have hereunto set my hand.

BURTON S. AIKMAN.